(12) United States Patent
Lee et al.

(10) Patent No.: US 10,263,248 B2
(45) Date of Patent: Apr. 16, 2019

(54) LITHIUM SECONDARY BATTERY

(71) Applicant: LG Chem, Ltd., Seoul (KR)

(72) Inventors: Yong Ju Lee, Daejeon (KR); Hyun Wook Kim, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/909,331

(22) PCT Filed: Jun. 19, 2015

(86) PCT No.: PCT/KR2015/006262
§ 371 (c)(1),
(2) Date: Feb. 1, 2016

(87) PCT Pub. No.: WO2015/199384
PCT Pub. Date: Dec. 30, 2015

(65) Prior Publication Data
US 2016/0197340 A1    Jul. 7, 2016

(30) Foreign Application Priority Data

Jun. 26, 2014 (KR) .......... 10-2014-0079097
Jun. 19, 2015 (KR) .......... 10-2015-0087199

(51) Int. Cl.
*H01M 4/36* (2006.01)
*H01M 4/587* (2010.01)
(Continued)

(52) U.S. Cl.
CPC ............ *H01M 4/364* (2013.01); *H01M 4/13* (2013.01); *H01M 4/38* (2013.01); *H01M 4/386* (2013.01);
(Continued)

(58) Field of Classification Search
None
See application file for complete search history.

(56) References Cited

U.S. PATENT DOCUMENTS

2008/0182173 A1  7/2008  Im et al.
2009/0035660 A1  2/2009  Fujihara et al.
(Continued)

FOREIGN PATENT DOCUMENTS

EP    2665111 A2    11/2013
JP    H11297309 A   10/1999
(Continued)

OTHER PUBLICATIONS

Oh et al. (KR 10-2014-0032834) (a raw machine translation) (Abstract, Detailed Description & Drawings) (Mar. 14, 2014).*
(Continued)

*Primary Examiner* — Carmen V Lyles-Irving
(74) *Attorney, Agent, or Firm* — Lerner, David, Littenberg, Krumholz & Mentlik, LLP (57) ABSTRACT

The present invention relates to a lithium secondary battery including a negative electrode and a positive electrode, wherein the negative electrode includes a first negative electrode active material made of a carbonaceous material, and a second negative electrode active material having a lower initial charge/discharge efficiency than the first negative electrode active material, and the initial charge/discharge efficiency of the negative electrode is lower than the initial charge/discharge efficiency of the positive electrode. The present invention provides a lithium secondary battery capable of realizing high output by remarkably reducing the resistance at a low state-of-charge (SOC) level.

13 Claims, 2 Drawing Sheets

(51) Int. Cl.
*H01M 4/38* (2006.01)
*H01M 4/505* (2010.01)
*H01M 4/525* (2010.01)
*H01M 10/0525* (2010.01)
*H01M 4/48* (2010.01)
*H01M 10/052* (2010.01)
*H01M 4/13* (2010.01)
*H01M 10/42* (2006.01)
*H01M 4/02* (2006.01)

(52) U.S. Cl.
CPC ............ *H01M 4/48* (2013.01); *H01M 4/505* (2013.01); *H01M 4/525* (2013.01); *H01M 4/587* (2013.01); *H01M 10/052* (2013.01); *H01M 10/0525* (2013.01); *H01M 2004/027* (2013.01); *H01M 2010/4292* (2013.01); *H01M 2220/30* (2013.01); *Y02T 10/7011* (2013.01)

(56) References Cited

U.S. PATENT DOCUMENTS

| | | | |
|---|---|---|---|
| 2009/0162751 | A1 | 6/2009 | Honbo et al. |
| 2009/0269669 | A1 | 10/2009 | Kim et al. |
| 2011/0070498 | A1* | 3/2011 | Mao .................. H01M 4/131 429/224 |
| 2012/0009452 | A1 | 1/2012 | Ueda |
| 2012/0052388 | A1* | 3/2012 | Jung .................. C22C 1/10 429/218.1 |
| 2012/0208087 | A1 | 8/2012 | Yamamoto et al. |
| 2012/0258362 | A1 | 10/2012 | Mah et al. |
| 2013/0302666 | A1* | 11/2013 | Park .................. H01M 4/606 429/163 |
| 2013/0309573 | A1* | 11/2013 | Ohba .................. H01M 4/131 429/218.1 |
| 2014/0050983 | A1 | 2/2014 | Kim et al. |

FOREIGN PATENT DOCUMENTS

| | | |
|---|---|---|
| JP | 2009037740 A | 2/2009 |
| JP | 2009158099 A | 7/2009 |
| JP | 2011113863 A | 6/2011 |
| JP | 2013242997 A | 12/2013 |
| KR | 100838944 B1 | 6/2008 |
| KR | 20080070492 A | 7/2008 |
| KR | 101002539 B1 | 12/2010 |
| KR | 20130129147 A | 11/2013 |
| KR | 20140022682 A | 2/2014 |
| KR | 101374789 B1 | 3/2014 |
| KR | 20140032834 A | 3/2014 |
| WO | 2011027503 A1 | 3/2011 |
| WO | 2011145301 A1 | 11/2011 |
| WO | 2012014998 A1 | 2/2012 |

OTHER PUBLICATIONS

Tamura et al. (JP, 2014-044921) (a raw machine translation) (Abstract) (Mar. 13, 2014) (Year: 2014).*
Tamura et al. (JP, 2014-044921) (a raw machine translation) (Detailed Description) (Mar. 13, 2014) (Year: 2014).*
International Search Report for Application No. PCT/KR2015/006262 dated Aug. 17, 2015.
Extended Search Report from European Application No. 15812380.2, dated Apr. 25, 2016.

* cited by examiner

LITHIUM SECONDARY BATTERY

CROSS-REFERENCE TO RELATED APPLICATION

This application is a national phase entry under 35 U.S.C. § 371 of International Application No. PCT/KR2015/006262, filed Jun. 19, 2015, which claims priority to Korean Patent Application No. 10-2014-0079097, filed Jun. 26, 2014 and Korean Patent Application No. 10-2015-0087199, filed Jun. 19, 2015, the disclosures of which are incorporated herein by reference.

TECHNICAL FIELD

The present invention relates to a lithium secondary battery, and more particularly, to a lithium secondary battery in which the initial charge/discharge efficiency of a negative electrode is lower than the initial charge/discharge efficiency of a positive electrode.

BACKGROUND ART

With the recent rapid quick supply of electronic systems used in batteries for cellular phones, notebook computers, electric cars, etc., there is a rapidly increasing demand for small, lightweight and relatively higher-capacity secondary batteries. In particular, lithium secondary batteries have come into the spotlight as drive power sources for portable devices since they are lightweight, and have a high energy true density. Therefore, there have been extensive research and development efforts to improve the performance of lithium secondary batteries.

Lithium secondary batteries produce electric energy through an oxidation-reduction reaction when lithium ions are intercalated/deintercalated into/from negative electrodes and positive electrodes, both of which are made of an active material enabling intercalation and deintercalation of lithium ions, in a state in which an organic electrolyte solution or a polymer electrolyte solution is filled between the negative electrodes and the positive electrodes.

A transition metal compound such as lithium cobalt oxide ($LiCoO_2$), lithium nickel oxide ($LiNiO_2$), lithium manganese oxide ($LiMnO_2$), and the like is widely used as the positive electrode active material for lithium secondary batteries. Also, a crystalline carbon material having a high softening degree, such as natural graphite or artificial graphite, or a pseudo-graphite structure or amorphous carbon material, which is obtained by carbonizing a hydrocarbon or a polymer at a low temperature of 1,000 to 1,500° C., is generally used as the negative electrode active material. Since the crystalline carbon material has a high true density, it has advantages in that it is desirably used to pack an active material, and exhibits excellent potential flatness, initial capacity and charge/discharge reversibility.

Generally, soft carbon, hard carbon, or small-particle graphite has been used as the negative electrode active material to express the high-output performance of lithium secondary batteries. However, when such a carbonaceous negative electrode active material is used in the negative electrode, a discharge end portion of the negative electrode passes through a region to which the highest resistance is generally applied, that is, a discharge end portion of the positive electrode, resulting in an increase in resistance. As a result, the output of the secondary battery at a low state-of-charge (SOC) level may be remarkably reduced.

DISCLOSURE

Technical Problem

It is an object of the present invention to provide a lithium secondary battery capable of realizing high output by remarkably reducing the resistance at a low state-of-charge (SOC) level.

Technical Solution

To solve the problems, according to an aspect of the present invention, there is provided a lithium secondary battery including a negative electrode and a positive electrode, wherein the negative electrode includes a first negative electrode active material made of a carbonaceous material, and a second negative electrode active material having a lower initial charge/discharge efficiency than the first negative electrode active material, and the initial charge/discharge efficiency of the negative electrode is lower than the initial charge/discharge efficiency of the positive electrode.

Advantageous Effects

According to exemplary embodiments of the present invention, the resistance can be remarkably reduced since a discharge end portion (an end portion at which the discharge occurs) of a negative electrode may avoid a discharge end portion of a positive electrode at a low SOC level at which great resistance is applied as whole, for example, an SOC level of 10% to 30%, by inducing the initial charge/discharge efficiency of the negative electrode to be lower than the initial charge/discharge efficiency of the positive electrode. Therefore, output characteristics of the secondary battery can be improved.

DESCRIPTION OF DRAWINGS

The following drawings accompanied in this specification are provided to exemplify preferred embodiments of the present invention, and serve to aid in understanding the scope of the present invention in conjunction with the above-described contents of the present invention. Therefore, it should be understood that the present invention is not intended to limit the contents shown in the drawings.

BEST MODE

Hereinafter, the present invention will be described in further detail in order to aid in understanding the present invention.

The terms or words used in the specification and claims of the present application are not to be construed as limited to ordinary or dictionary meanings, but should be construed as meanings and concepts conforming to the technical spirit of the present invention on the basis of the principle that the inventors can define the concept of the terms properly to explain the instant invention with the best way.

The lithium secondary battery according to one exemplary embodiment of the present invention includes a negative electrode and a positive electrode, wherein the negative electrode includes a first negative electrode active material made of a carbonaceous material, and a second negative electrode active material having a lower initial charge/discharge efficiency than the first negative electrode active material, and the initial charge/discharge efficiency of the negative electrode is lower than the initial charge/discharge efficiency of the positive electrode.

As such, the resistance may be remarkably reduced since a discharge end portion (an end portion at which the discharge occurs) of the negative electrode may avoid a discharge end portion of the positive electrode at a low SOC level at which great resistance is applied as whole, for example, an SOC level of 10% to 30%, by inducing the initial charge/discharge efficiency of the negative electrode to be lower than the initial charge/discharge efficiency of the positive electrode. Therefore, output characteristics of the secondary battery can be improved.

In the lithium secondary battery according to one exemplary embodiment of the present invention, the initial charge/discharge efficiency of the negative electrode may be particularly 0% or greater to 10% or less, more particularly 0.5% to 9%, and further particularly 0.7% to 8.5% lower than the initial charge/discharge efficiency of the positive electrode. When the initial charge/discharge efficiency of the negative electrode is greater than 10% lower than the initial charge/discharge efficiency of the positive electrode, the capacity of the secondary battery may be significantly lowered since a large amount of lithium ions from the positive electrode is consumed to form an initial irreversible reaction of the negative electrode. On the other hand, when the initial charge/discharge efficiency of the negative electrode is higher than or equal to the initial charge/discharge efficiency of the positive electrode, a rate at which lithium ions from a discharge end of the positive electrode (a discharge end portion of the positive electrode) enter an inner part of the positive electrode, that is, a lithium diffusion rate, slows down, resulting in a decrease in total output of the secondary battery.

Figure 1:
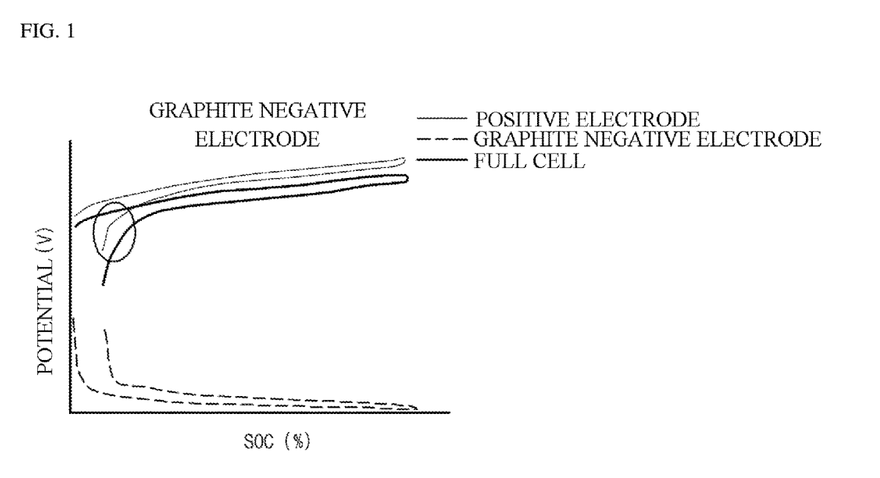
FIG. 1 is a conceptual diagram showing charge/discharge characteristics of a negative electrode including graphite, a positive electrode, and a secondary battery according to an SOC level.
Figure 2:
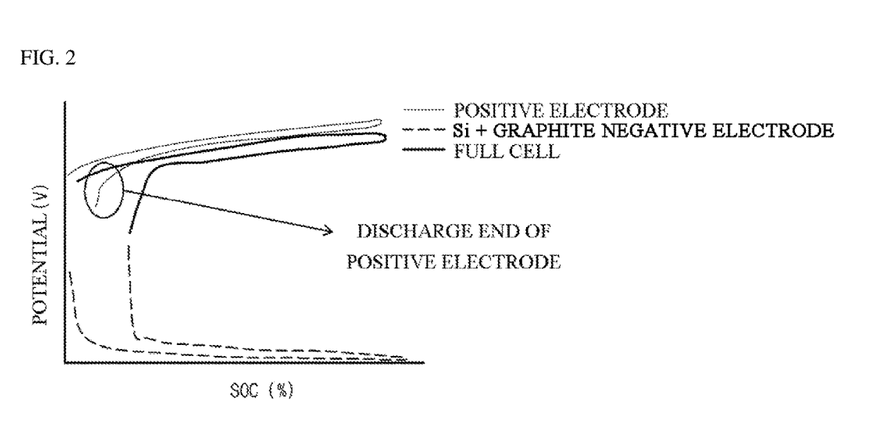
FIG. 2 is a conceptual diagram showing charge/discharge characteristics of a negative electrode including a mixed negative electrode active material of graphite and Si, a positive electrode, and a secondary battery according to an SOC level.

FIGS. 1 and 2 are conceptual diagrams showing charge/discharge characteristics of the positive electrode, the negative electrode, and the secondary battery according to an SOC level (%). FIGS. 1 and 2 are merely examples disclosed to explain the present invention, but not intended to limit the present invention. Hereinafter, the present invention will be described with reference to FIGS. 1 and 2.

As shown in FIG. 1, when graphite having an initial charge/discharge efficiency of 93% is used as the negative electrode active material to realize a negative electrode, and a positive electrode having an initial charge/discharge efficiency of 92% is used so that the initial charge/discharge efficiency of the negative electrode is higher than or equal to the initial charge/discharge efficiency of the positive electrode, a discharge end portion of the negative electrode passes through a discharge end portion of the positive electrode at a level to which the highest resistance is applied, that is, a low SOC level (for example, an SOC level of 10% to 30%), thereby remarkably reducing the output of the secondary battery due to a significant increase in resistance.

On the contrary, as shown in FIG. 2, when graphite having an initial charge/discharge efficiency of 93% (a first negative electrode active material) and Si having an initial charge/discharge efficiency of 5% (a second negative electrode active material) are mixed, and used as a negative electrode having an initial charge/discharge efficiency of 84.7%, and a positive electrode having an initial charge/discharge efficiency of 93% so that the initial charge/discharge efficiency of the negative electrode is lower than the initial charge/discharge efficiency of the positive electrode, the resistance may be reduced by inducing a discharge end portion of the negative electrode to avoid a discharge end portion of the positive electrode (an end portion to which great resistance is applied as whole).

In the lithium secondary battery according to one exemplary embodiment of the present invention, the initial charge/discharge efficiency of the negative electrode may be in a range of particularly 80% to 92%, more particularly 82% to 91%, and further particularly 84% to 90%. In the present invention, the initial charge/discharge efficiency may refer to a discharge capacity when a battery is discharged at 1.5 V or less. Particularly in the present invention, a manufactured electrode may be charged at constant current (CC) of 0.1 C until a voltage reaches 5 mV, and then charged at a constant voltage (CV) until a charging current reaches 0.005 C to complete the first cycle, thereby measuring a charge capacity. Also, the electrode may be kept for 30 minutes, discharged at a constant current of 0.1 C until the voltage reaches 1.5 V so as to measure a discharge capacity at the first cycle. Then, the initial charge/discharge efficiency may be calculated from the charge capacity and the discharge capacity at the first cycle.

In the lithium secondary battery according to one exemplary embodiment of the present invention, the negative electrode may also have a higher irreversible capacity than the positive electrode.

Further, in the lithium secondary battery according to one exemplary embodiment of the present invention, the negative electrode includes a first negative electrode active material, and a second negative electrode active material having a lower initial charge/discharge efficiency than the first negative electrode active material together so as to induce the initial charge/discharge efficiency of the negative electrode to be lower than the initial charge/discharge efficiency of the positive electrode. The initial charge/discharge efficiency may be affected by the types, particle size or content of an active material. Therefore, the lithium secondary battery according to one exemplary embodiment of the present invention may include a properly controlled type, particle size or content of the active material so as to meet the requirements for the above-described initial charge/discharge efficiency, or may include a combination of the above-listed properly controlled factors.

Also, in the lithium secondary battery according to one exemplary embodiment of the present invention, the first negative electrode active material is not particularly limited as long as it enables intercalation/deintercalation of lithium ions during charging/discharging of the secondary battery. Specific examples of the first negative electrode active material include amorphous carbon prepared by thermally treating a coal tar pitch, a petroleum pitch, or various organic materials as a source material, and crystalline carbon such as natural graphite having a high degree of graphitization, artificial graphite, carbon black, meso carbon microbeads (MCMB), carbon fibers, etc. Among these, graphite such as artificial graphite and natural graphite is particularly preferably used as the first negative electrode active material.

Also, the first negative electrode active material may have an average particle size ($D_{50}$) of 2 μm to 30 μm, more particularly 5 μm to 20 μm. In the present invention, the average particle size ($D_{50}$) of the first negative electrode active material may be defined as a particle size, based on 50% of the particle size distribution. The average particle size ($D_{50}$) of the first negative electrode active material may, for example, be measured using a laser diffraction method. More particularly, the first negative electrode active material may be dispersed in a dispersion medium, introduced into a commercially available laser diffraction particle analyzer (for example, Microtrac MT 3000), and irradiated with an ultrasonic wave of approximately 28 kHz at a power of 60 W, and the average particle size ($D_{50}$) may be calculated based on 50% of the particle size distribution in the particle analyzer.

In the lithium secondary battery according to one exemplary embodiment of the present invention, the initial charge/discharge efficiency of the second negative electrode active material may be lower than the initial charge/discharge efficiency of the first negative electrode active material, particularly approximately 20% to 90%, more particularly approximately 30% to 90%, and further particularly approximately 40% to 90% lower than the initial charge/discharge efficiency of the first negative electrode active material.

Also, the second negative electrode active material may meet the difference in the initial charge/discharge efficiency, and may also have an initial charge/discharge efficiency of particularly approximately 3% to 88%, more particularly approximately 4% to 80%, and further particularly approximately 4% to 60%.

Preferably, the second negative electrode active material having an initial charge/discharge efficiency of said range may also possibly have a higher charge capacity and a lower discharge capacity. Particularly, the second negative electrode active material may be one or a mixture of two or more selected from the group consisting of a Si-based material, a Sn-based material, and an oxide thereof. Also, the Si-based material may, for example, be Si, Si nanoparticles, or a Si nanowire, and the oxide of the Si-based or Sn-based material may, for example, be one or a mixture of two or more selected from the group consisting of $SiO_x$ (where x is 0<x<2), and SnO. One or a mixture of two or more selected from the group consisting of the above-listed Si-based or Sn-based material, or the oxide thereof, more particularly Si and $SiO_x$ (where x is 0<x<2) is a high-capacity, non-carbonaceous negative electrode active material characterized in that it has a low initial charge/discharge efficiency, and its irreversible capacity increases during a lithium intercalation and deintercalation process as the cycles are repeatedly performed. Therefore, it may be desirable in an aspect of enhancing the initial irreversible capacity of negative electrode Also, the average particle size ($D_{50}$) of the second negative electrode active material may be in a range of 50 nm to 10 μm, more particularly 100 nm to 5 μm, and further particularly 100 nm to 2.5 μm. The average particle size ($D_{50}$) of the second negative electrode active material may be measured in the same manner as described above with respect to the first negative electrode active material.

According to one exemplary embodiment of the present invention, the second negative electrode active material may have little or no discharge capacity since the second negative electrode active material participates in a reaction only in an initial charge/discharge operation that is an initial formation operation of a battery.

A method of allowing the second negative electrode active material to have little or no discharge capacity is not particularly limited. For example, a method in which the second negative electrode active material such as a Si-based material, a Sn-based material, and an oxide thereof, each of which has a high average particle size, is used to participate in charging or not to participate in discharging, a method of increasing an amount of oxygen in the case of an oxide, or a method of adjusting an amount of the second negative electrode active material used may be used. In this case, the second negative electrode active material may not participate in the discharging in a state in which a large amount of lithium ions are occluded, but only a carbonaceous material that is the first negative electrode active material may participate in the discharging. Therefore, only the carbonaceous material may mainly contribute to the discharge capacity, thereby improving high output and shelf life characteristics of the secondary battery at the same time.

More particularly, in the lithium secondary battery according to one exemplary embodiment of the present invention, the negative electrode includes graphite as the first negative active material so as to meet the difference in initial charge/discharge efficiency between the above-described first and second negative electrode active materials, and initial charge/discharge efficiency ranges of the respective first and second negative electrode active materials. Also, the negative electrode may include one or a mixture of two or more selected from the group consisting of a Si-based material, a Sn-based material, and an oxide thereof as the second negative electrode active material. Further particularly, the negative electrode includes graphite having an average diameter ($D_{50}$) of 2 μm to 30 μm as the first negative active material. Also, the negative electrode may include one or a mixture of two or more selected from the group consisting of Si and $SiO_x$ (where x is 0<x<2), which have an average particle diameter ($D_{50}$) of 50 nm to 10 μm, as the second negative electrode active material.

Also, according to one exemplary embodiment of the present invention, when the above-described second negative electrode active material is mixed with the first negative electrode active material to be used, the initial charge/discharge efficiency of the negative electrode may be further reduced even when used at a smaller amount compared to when the first negative electrode active material is used alone, thereby effectively adjusting the initial charge/discharge efficiency of the negative electrode.

Particularly, a mixing ratio of the first negative electrode active material and the second negative electrode active material may be in a range of 80:20 to 99.95:0.05, more particularly 93:7 to 99.95:0.05, further particularly 95:5 to 99.95:0.05, and most particularly 98.7:1.3 to 99.95:0.05, based on the weight ratio. When the second negative electrode active material is used at an amount less than this range, a discharge potential of the negative electrode may be enhanced. On the other hand, when the second negative electrode active material is used at an amount greater than this range, the first negative electrode active material that is a carbonaceous material is used at a relatively small amount, resulting in degraded capacity characteristics and shelf life characteristics of the secondary battery.

More particularly, to meet the requirements for the initial charge/discharge efficiency between the positive electrode and the negative electrode as well as the initial charge/discharge requirements of the first and second negative electrode active materials in the negative electrode, the negative electrode may include the above-described first negative electrode active material, particularly graphite, and more particularly graphite having an average diameter ($D_{50}$) of 2 μm to 30 μm; and the second negative electrode active material, particularly one or a mixture of two or more selected from the group consisting of a Si-based material, a Sn-based material, and an oxide thereof, and more particularly one or a mixture of two or more selected from the group consisting of Si and $SiO_x$ (where x is 0<x<2), which have an average particle diameter ($D_{50}$) of 50 nm to 10 μm, with the weight ratio of 80:20 to 99.95:0.05.

In the lithium secondary battery according to one exemplary embodiment of the present invention, a method of blending the first negative electrode active material and the second negative electrode active material to form a mixed negative electrode active material is not particularly limited, but various methods known in the related art may be used herein.

According to one exemplary embodiment of the present invention, the first negative electrode active material and the second negative electrode active material may be simply mixed, or mechanically mixed in an aspect of a mixing method. For example, the first negative electrode active material and the second negative electrode active material may be simply mixed using a motar, or compression stress may be mechanically applied by rotating the first negative electrode active material and the second negative electrode active material at a rotation of 100 to 1,000 rpm using a blade or a ball mill, thereby forming a composite.

According to still another exemplary embodiment of the present invention, the first negative electrode active material and the second negative electrode active material may be present in a state in which a surface of one of the first negative electrode active material and the second negative electrode active material is coated onto a surface of the other negative electrode active material, or the first negative electrode active material and the second negative electrode active material may be blended with each other to be in the form of a composite. When the surface is coated, for example, the second negative electrode active material may be coated onto the first negative electrode active material, or the first negative electrode active material may be coated onto the second negative electrode active material.

Also, in the lithium secondary battery according to one exemplary embodiment of the present invention, the negative electrode may further include at least one third negative electrode active material.

For example, another third negative electrode active material may be coated onto the surfaces of the first negative electrode active material and the second negative electrode active material, or the first negative electrode active material and the second negative electrode active material according to one exemplary embodiment of the present invention may be coated onto a surface of the third negative electrode active material. In addition, all the first to third negative electrode active materials may be blended with each other by simple mixing or mechanical mixing to be included in the form of a composite. In this case, the third negative electrode active material may especially have a higher initial charge/discharge efficiency than the first negative electrode active material. Thus, at least one negative electrode active material generally used in the related art may be included when it meets the requirements for the initial charge/discharge efficiency.

Meanwhile, in the lithium secondary battery according to one exemplary embodiment of the present invention, the positive electrode active material included in the positive electrode is not particularly limited, but may, for example, include one or a mixture of two or more selected from the group consisting of $LiCoO_2$, $LiNiO_2$, $LiMnO_2$, $LiMn_2O_4$, $Li(Ni_aCo_bMn_c)O_2$ (where 0<a<1, 0<b<1, 0<c<1, and a+b+c=1), $Li(Ni_aCo_bAl_c)O_2$ (where 0<a<1, 0<b<1, 0<c<1, and a+b+c=1), $LiNi_{1-y}Co_yO_2$ (where 0≤Y≤1), $LiCo_{1-y}Mn_yO_2$ (where 0≤Y<1), $LiNi_{1-y}Mn_yO_2$ (where 0≤Y<1), $Li(Ni_aCo_bMn_c)O_4$ (where 0<a<2, 0<b<2, 0<c<2, and a+b+c=2), $LiMn_{2-z}Ni_zO_4$ (where 0<Z<2), $LiMn_{2-z}Co_zO_4$ (where 0<Z<2), $Li(Li_aM_{b-a-b'}M'_{b'})O_{2-c}A_c$ (where 0≤a≤0.2, 0.6≤b≤1, 0≤b'≤0.2, 0≤c≤0.2; M includes Mn, and at least one selected from the group consisting of Ni, Co, Fe, Cr, V, Cu, Zn, and Ti; M' is at least one selected from the group consisting of Mg, Sr, Ba, Cd, Zn, Al, Ti, Fe, V, and Li, and A is at least one selected from the group consisting of P, F, S, and N), and $Li_xFePO_4$ (where 0.5<x<1.3).

Also, in the case of a lithium nickel-cobalt-manganese oxide, when the content of manganese included in a transition metal is greater than or equal to 50 mol %, capacity characteristics of the secondary battery may be very low to any extent in which the secondary battery should be charged to a high voltage to be activated. The structure of the secondary battery may be damaged due to such high-voltage charging. Therefore, in the lithium secondary battery according to one exemplary embodiment of the present invention, the positive electrode active material may include at least one selected from the group consisting of $Li(Ni_aCo_bMn_c)O_2$ (where 0<a<1, 0<b<1, 0<c<0.5, and a+b+c=1), $Li(Ni_aCo_bAl_c)O_2$ (where 0<a<1, 0<b<1, 0<c<1, and a+b+c=1), and a mixture thereof, in consideration of significant improvement effects of battery performance, output characteristics, and shelf life characteristics under the control of the initial charge/discharge efficiency of the above-described positive electrode and negative electrode.

In the lithium secondary battery according to one exemplary embodiment of the present invention, the positive electrode active material and the negative electrode active material included respectively in the positive electrode and the negative electrode are not particularly limited as long as they meet the requirements for the initial charge/discharge efficiency of the positive electrode and the negative electrode, that is, the initial charge/discharge efficiency of the negative electrode is lower than the initial charge/discharge efficiency of the positive electrode. For example, when the negative electrode includes graphite as the first negative electrode active material, and includes a Si-based material (for example, Si particles), a Sn-based material, or an oxide thereof as the second negative electrode active material, the positive electrode may include $Li(Ni_aCo_bMn_c)O_2$ (where 0<a<1, 0<b<1, 0<c<0.5, and a+b+c=1), $Li(Ni_aCo_bAl_c)O_2$ (where 0<a<1, 0<b<1, 0<c<1, and a+b+c=1), or a mixture thereof as the positive electrode active material to induce the initial charge/discharge efficiency of the negative electrode to be lower than the initial charge/discharge efficiency of the positive electrode so as to realize high output characteristics most effectively.

In the present invention, the initial charge/discharge efficiency of the positive electrode is measured in the same manner as described above for the initial charge/discharge efficiency of the negative electrode. In this case, the charge capacity and discharge capacity may be measured at a charge voltage of 4.2 V to 4.4 V and at a discharge voltage of 3 V to 2.5 V, depending on the type of the positive electrode. Then, the initial charge/discharge efficiency may be calculated using the charge capacity and discharge capacity. Also, the charge voltage may also be measured at a voltage, for example, approximately 50 mV higher than a charge potential in a full cell.

The lithium secondary battery according to one exemplary embodiment of the present invention may be manufactured using conventional methods, except that the above-described positive and negative electrodes are used herein.

Particularly, the lithium secondary battery may be manufactured by disposing a separator between the positive electrode and the negative electrode to form an electrode assembly, putting the electrode assembly into a pouch-like or cylindrical battery case, or a polygonal battery case, and injecting an electrolyte solution; or by stacking the electrode assembly, immersing the electrode assembly in an electrolyte solution, and sealing the resulting product in a battery case.

The negative electrode may be manufactured using manufacturing methods generally used in the related art. For example, the negative electrode may be manufactured by mixing a binder, a solvent, and optionally a conductive agent and a dispersing agent with the negative electrode active material according to one exemplary embodiment of the present invention, stirring the resulting mixture to prepare slurry, coating a current collector with the slurry, and compressing the resulting product.

Various kinds of binder polymers such as a polyvinylidene fluoride-hexafluoropropylene copolymer (PVDF-co-HEP), polyvinylidene fluoride, polyacrylonitrile, polymethyl methacrylate, polyvinyl alcohol, carboxylmethyle cellulose (CMC), starch, hydroxypropyl cellulose, regenerated cellulose, polyvinyl pyrrolidone, tetrafluoroethylene, polyethylene, polypropylene, polyacrylic acid, a styrene-butadiene rubber (SBR), a fluorinated rubber, various copolymers, and the like may be used as the binder.

N-methylpyrrolidone, acetone, water, and the like may be used as the solvent.

The conductive agent is not particularly limited as long as it exhibits conductivity without causing a chemical change in the corresponding battery. For example, graphite such as natural graphite or artificial graphite; carbon black such as carbon black, acetylene black, ketjen black, channel black, furnace black, lamp black, thermal black, and the like; a conductive fiber such as a carbon fiber or a metal fiber; a metal powder such as fluorinated carbon, aluminum, or nickel powder; a conductive whisker such as zinc oxide, potassium titanate, and the like; a conductive metal oxide such as titanium oxide; a conductive material such as polyphenylene derivatives, and the like may be used as the conductive agent.

An aqueous dispersing agent, or an organic dispersing agent, such as N-methyl-2-pyrrolidone, may be used as the dispersing agent.

Like the manufacture of the above-described negative electrode, the positive electrode may be manufactured by mixing a positive electrode active material, a conductive agent, a binder, and a solvent to prepare slurry, directly coating a metal current collector with the slurry, or casting the slurry onto a separate support, and laminating a film of the positive electrode active material peeled from the support on a metal current collector. The same conductive agent, binder and solvent used to manufacture the negative electrode may be used to manufacture the positive electrode.

Also, conventional porous polymer films used as traditional separators, for example, porous polymer films made of polyolefin-based polymers such as an ethylene homopolymer, a propylene homopolymer, an ethylene/butene copolymer, an ethylene/hexene copolymer, and an ethylene/methacrylate copolymer, may be used alone or in a staked form as the separator sandwiched between the negative electrode and the positive electrode. Also, an insulating thin film having high ion permeability and mechanical strength may be used. The separator may include a safety-reinforced separator (SRS) in which a surface of a separator is thinly coated with a ceramic material. In addition, conventional porous nonwoven fabrics, for example, nonwoven fabrics made of a high-melting-point glass fiber, a polyethylene terephthalate fiber, and the like may be used as the separator, but the present invention is not limited thereto.

Also, a lithium salt that may be included as an electrolyte in the electrolyte solution may be used without limitation as long as it is generally used in the electrolyte solution for secondary batteries. For example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as a negative ion of the lithium salt.

In addition, an organic solvent included in the electrolyte solution may be used without limitation as long as it is generally used in the art. At least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxy ethane, diethoxy ethane, vinylene carbonate, sulfolane, γ-butyrolactone, propylene sulfite, and tetrahydrofuran may be representatively used as the organic solvent.

Further, the battery case used in the present invention may be chosen as long as it is typically used in the related art. For example, an outer shape of the battery case according to the use of the battery is not particularly limited, but may include a cylindrical shape using a can, an angular shape, a pouch-like shape, or a coin-like shape.

The lithium secondary battery according to one exemplary embodiment of the present invention may be applied to a battery cell used as a power source for small-sized devices, and may also be particularly properly used as a power source for medium- or large-sized devices, that is, a unit battery for battery modules. Here, the medium- or large-sized devices may include a power tool; an electric car including an electric vehicle (EV), a hybrid electric vehicle (HEV), and a plug-in hybrid electric vehicle (PHEV); an electric two-wheeled vehicle including an E-bike, and an E-scooter; an electric golf cart; an electric truck; an electric commercial vehicle; and a power storage system, but the present invention is not particularly limited thereto.

Hereinafter, the present invention will be described in further detail with reference to Examples to aid in understanding the present invention. However, it should be understood that the following Examples of the present invention may be changed in various forms, and thus are not intended to limit the scope of the present invention to the following Examples.

Example 1

Manufacture of Lithium Secondary Battery in which Negative Electrode has Initial Charge/Discharge Efficiency of 84.7% and Positive Electrode has Initial Charge/Discharge Efficiency of 93%

<Manufacture of Negative Electrode>

Graphite having an initial charge/discharge efficiency of approximately 93% and an average particle size of approximately 15 μm as a first negative electrode active material, and a Si powder having an initial charge/discharge efficiency of approximately 5% and an average diameter of approximately 2 μm as a second negative electrode active material were mixed at a weight ratio of 99:1 to prepare a mixed negative electrode active material.

The mixed negative electrode active material, Super-P as a conductive agent, a styrene-butadiene rubber (SBR) as a binder, and carboxylmethyle cellulose (CMC) as a thickener were mixed at a weight ratio of 96:1:1.5:1.5, and the resulting mixture was mixed with water ($H_2O$) as a solvent to prepare uniform negative electrode active material slurry.

One surface of a copper current collector was coated with the resulting negative electrode active material slurry to a thickness of 65 μm, dried, roll pressed, and then punched with a constant size to manufacture a negative electrode.

<Manufacture of Positive Electrode>

$Li(Ni_{0.8}Mn_{0.1}Co_{0.1})O_2$ as a positive electrode active material, super-P as a conductive material, and polyvinylidene fluoride as a binder were mixed at a weight ratio of 95:2.5:2.5 to prepare positive electrode active material slurry. One surface of an aluminum current collector was coated with the resulting slurry, dried, roll pressed, and then punched with a constant size to manufacture a positive electrode.

<Manufacture of Lithium Secondary Battery>

An organic solvent having compositions of ethylene carbonate (EC), propylene carbonate (PC), and diethyl carbonate (DEC) at a volume ratio of 3:2:5, and 1.0 M $LiPF_6$ were added to prepare a non-aqueous electrolyte solution.

Also, a polyolefin separator was sandwiched between the positive electrode and the negative electrode, and the electrolyte solution was injected therebetween to manufacture a lithium secondary battery.

Example 2

Manufacture of Lithium Secondary Battery in which Negative Electrode has Initial Charge/Discharge Efficiency of 87.1% and Positive Electrode has Initial Charge/Discharge Efficiency of 88%

A lithium secondary battery was manufactured in the same manner as in Example 1, except that the first negative electrode active material (graphite) and the second negative electrode active material (Si) used in Example 1 were mixed at a weight ratio of 99.3:0.7, and used, and $Li(Ni_{0.5}Mn_{0.3}Co_{0.2})O_2$ was used as the positive electrode active material.

Example 3

Manufacture of Lithium Secondary Battery in which Negative Electrode has Initial Charge/Discharge Efficiency of 82% and Positive Electrode has Initial Charge/Discharge Efficiency of 93%

A lithium secondary battery was manufactured in the same manner as in Example 1, except that the first negative electrode active material (graphite) and the second negative electrode active material (Si) used in Example 1 were mixed at a weight ratio of 98.6:1.4, and used.

Comparative Example 1

Manufacture of Lithium Secondary Battery in which Negative Electrode has Initial Charge/Discharge Efficiency of 93% and Positive Electrode has Initial Charge/Discharge Efficiency of 93%

A lithium secondary battery was manufactured in the same manner as in Example 1, except that a first negative electrode active material, graphite having an average particle size of approximately 15 μm, was used alone as the negative electrode active material in the manufacture of the negative electrode.

Comparative Example 2

Manufacture of Lithium Secondary Battery in which Negative Electrode has Initial Charge/Discharge Efficiency of 93% and Positive Electrode has Initial Charge/Discharge Efficiency of 88%

A lithium secondary battery was manufactured in the same manner as in Example 1, except that graphite having an average particle size of approximately 15 μm was used alone as the negative electrode active material, and $Li(Ni_{0.5}Mn_{0.3}Co_{0.2})O_2$ was used as the positive electrode active material.

Experimental Example 1

Measurement of Initial Charge/Discharge Efficiency

Each of the positive electrodes and the negative electrodes manufactured in Examples 1 to 3 and Comparative Examples 1 and 2 was charged at a constant current (CC) of 0.1 C until a voltage reached 5 mV, and then charged at a constant voltage (CV) until a charging current reaches 0.005 C to complete the first cycle. Then, each of the positive electrodes and the negative electrodes was kept for 30 minutes, discharged at a constant current of 0.1 C until the voltage reached 1.5 V to measure a discharge capacity at the first cycle. In this case, the initial charge/discharge efficiency was calculated from the charge capacity and the discharge capacity at the first cycle. The results are listed in the following Table 1.

TABLE 1

| | Negative electrode | | | Positive electrode | | |
|---|---|---|---|---|---|---|
| | Initial charge/discharge efficiency (%) | Discharge capacity (mAh/g) | Charge capacity (mAh/g) | Initial charge/discharge efficiency (%) | Discharge capacity (mAh/g) | Charge capacity (mAh/g) |
| Example 1 | 84.7 | 358 | 423 | 93.0 | 170 | 183 |
| Example 2 | 87.1 | 359 | 412 | 88.0 | 158 | 180 |
| Example 3 | 82.0 | 358 | 436 | 93.0 | 170 | 183 |

TABLE 1-continued

|  | Negative electrode | | | Positive electrode | | |
| --- | --- | --- | --- | --- | --- | --- |
|  | Initial charge/discharge efficiency (%) | Discharge capacity (mAh/g) | Charge capacity (mAh/g) | Initial charge/discharge efficiency (%) | Discharge capacity (mAh/g) | Charge capacity (mAh/g) |
| Comparative Example 1 | 93.0 | 360 | 387 | 93.0 | 170 | 183 |
| Comparative Example 2 | 93.0 | 360 | 387 | 88.0 | 158 | 180 |

Initial charge/discharge efficiency = (discharge capacity at first cycle/charge capacity at first cycle) × 100

As listed in Table 1, it was revealed that the initial charge/discharge efficiency of the negative electrode was lower than the initial charge/discharge efficiency of the positive electrode in the lithium secondary batteries of Examples 1 to 3 of the present invention, particularly that the difference in initial charge/discharge efficiency between the positive electrode and the negative electrode was in a range of greater than 0% to 10% or less in the lithium secondary batteries of Examples 1 and 2, and the difference in initial charge/discharge efficiency between the positive electrode and the negative electrode was greater than 10% in the lithium secondary battery of Example 3.

Meanwhile, it was revealed that the initial charge/discharge efficiency of the negative electrode was identical to the initial charge/discharge efficiency of the positive electrode in the lithium secondary battery of Comparative Example 1, and the initial charge/discharge efficiency of the negative electrode was higher than the initial charge/discharge efficiency of the positive electrode in the lithium secondary battery of Comparative Example 2.

Experimental Example 2

Measurement of Resistance Characteristics According to SOC Levels

An improvement effect of resistance characteristics under the control of the initial charge/discharge efficiency in the positive electrode and the negative electrode of the lithium secondary battery according to one exemplary embodiment of the present invention was evaluated.

Specifically, mono-cells having the same capacity were manufactured using the positive electrodes and the negative electrodes manufactured in Example 1 and Comparative Example 1, and an electric current of 10 C was applied for 10 seconds to every zone per 10% at SOC levels of 10% to 90%. A drop in voltage (V) is caused due to high electric current, and the discharge resistance R may be calculated from the drop in voltage (V). The results are shown in FIG. 3.

Figure 3:
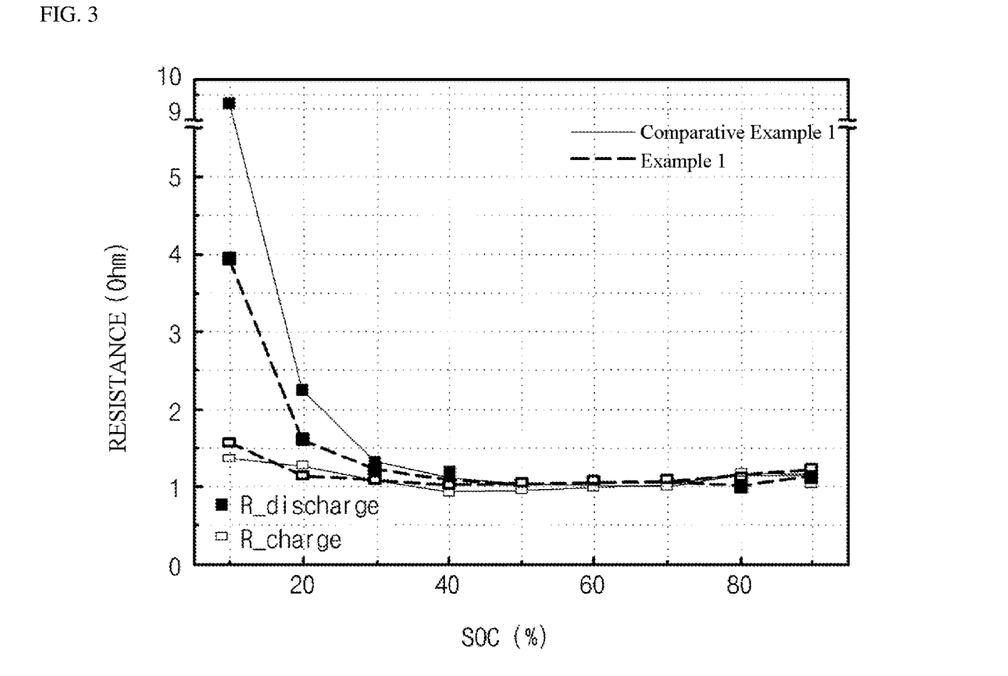
FIG. 3 is a graph illustrating resistance characteristics according to the SOC levels in Example 1 and Comparative Example 1, as measured in Experimental Example 2.

FIG. 3 is a graph illustrating the discharge resistance according to the SOC levels in the lithium secondary batteries of Example 1 and Comparative Example 1. In FIG. 3, ■ represents a discharge resistance (R_discharge) at every SOC level upon the discharge, and □ represents a charge resistance (R_charge) at every SOC level upon the charge.

Referring to FIG. 3, it could be seen that the discharge resistance at an SOC level of 10% to 30% was remarkably reduced in Example 1, compared to that in Comparative Example 1. Particularly, it could be seen that the discharge resistance was reduced by 125% or more at SOC levels of 10%, and approximately 40% at SOC levels of 20% in Example 1, compared to that in Comparative Example 1.

As shown in FIG. 3, it could also be seen that the resistance was remarkably reduced as a discharge end of the negative electrode avoided a discharge end (an end portion at which the discharge occurs) of the positive electrode at a low SOC level of 10 to 30% shown in FIG. 1, assuming that the output characteristics are improved due to the low resistance.

Further, the resistance according to an SOC level was measured for the lithium secondary batteries manufactured in Examples 1 to 3 and Comparative Examples 1 and 2.

Specifically, an electric current of 10 C was applied for 10 seconds to every zone per 10% at SOC levels of 10% to 90% under the same conditions as described above. A drop in voltage (V) is caused due to high electric current, and the discharge resistance R may be calculated from the drop in voltage (V). The results are listed in the following Table 2.

TABLE 2

|  | Discharge resistance according to SOC levels (ohm) | | |
| --- | --- | --- | --- |
|  | 10% | 20% | 30% |
| Example 1 | 3.95 | 1.54 | 1.25 |
| Example 2 | 8.75 | 2.2 | 1.32 |
| Example 3 | 8.96 | 2.22 | 1.35 |
| Comparative Example 1 | 9.12 | 2.25 | 1.38 |
| Comparative Example 2 | 15.3 | 5.41 | 3.61 |

As listed in Table 2, it was revealed that the lithium secondary battery of Example 3 exhibited higher discharge resistance than those of Examples 1 and 2 as the difference in initial charge/discharge efficiency between the positive electrode and the negative electrode was greater than 10%. However, it was revealed that the lithium secondary batteries of Examples 1 to 3 of the present invention had much lower discharge resistance than the secondary batteries of Comparative Examples 1 and 2. From these results, it could be seen that the lithium secondary batteries of Examples 1 to 3 had superior output characteristics.

The invention claimed is:

1. A lithium secondary battery comprising a negative electrode and a positive electrode,
   wherein the negative electrode comprises a first negative electrode active material made of a carbonaceous material, and a second negative electrode active material having a lower initial charge/discharge efficiency than the first negative electrode active material,
   wherein the initial charge/discharge efficiency of the negative electrode is lower than the initial charge/discharge efficiency of the positive electrode, and
   wherein the initial charge/discharge efficiency of the negative electrode is 1.1% to 8.3% lower than the initial charge/discharge efficiency of the positive electrode, and wherein the negative electrode comprises graphite as the first negative electrode active material, and the second negative electrode active material of the negative electrode consists of Si, and the mixing ratio of the first negative electrode active material and the second negative electrode active material is in a range of 80:20 to 99.95:0.05, based on the weight ratio.

2. The lithium secondary battery of claim 1, wherein the initial charge/discharge efficiency of the negative electrode is in a range of 80% to 92%.

3. The lithium secondary battery of claim 1, wherein the negative electrode has a higher irreversible capacity than the positive electrode.

4. The lithium secondary battery of claim 1, wherein the first negative electrode active material has an average particle diameter ($D_{50}$) of 2 μm to 30 μm.

5. The lithium secondary battery of claim 1, wherein the initial charge/discharge efficiency of the second negative electrode active material is 20% to 90% lower than that of the first negative electrode active material.

6. The lithium secondary battery of claim 1, wherein the second negative electrode active material has an average particle diameter ($D_{50}$) of 50 nm to 10 μm.

7. The lithium secondary battery of claim 1, wherein the second negative electrode active material participates in a reaction only in an initial charge/discharge operation of the secondary battery.

8. The lithium secondary battery of claim 1, wherein the negative electrode comprises graphite having an average particle diameter ($D_{50}$) of 2 μm to 30 μm as the first negative electrode active material, and the second negative electrode active material has an average particle diameter ($D_{50}$) of 50 nm to 10 μm.

9. The lithium secondary battery of claim 1, wherein the second negative electrode active material is coated onto the first negative electrode active material, or the first negative electrode active material is coated onto the second negative electrode active material.

10. The lithium secondary battery of claim 1, wherein the first negative electrode active material and the second negative electrode active material are mixed or blended with each other to be included in the form of a composite.

11. The lithium secondary battery of claim 1, wherein the negative electrode further comprises a third negative electrode active material having a higher initial charge/discharge efficiency than the first negative electrode active material.

12. The lithium secondary battery of claim 1, wherein the initial discharging of the negative electrode is performed at 1.5 V or less.

13. The lithium secondary battery of claim 1, wherein the positive electrode comprises at least one selected from the group consisting of $Li(Ni_aCo_bMn_c)O_2$ (where $0<a<1$, $0<b<1$, $0<c<0.5$, and $a+b+c=1$), $Li(Ni_aCo_bAl_c)O_2$ (where $0<a<1$, $0<b<1$, $0<c<1$, and $a+b+c=1$), and a mixture thereof as the positive electrode active material.

* * * * *